L. MARKO.
NOODLE CUTTING MACHINE.
APPLICATION FILED JUNE 29, 1918.

1,314,885.

Patented Sept. 2, 1919.
2 SHEETS—SHEET 1.

WITNESS
T.F. Dilworth

INVENTOR.
Louis Marko
By Max H. Srolovy
his attorney

L. MARKO.
NOODLE CUTTING MACHINE.
APPLICATION FILED JUNE 29, 1918.
1,314,885.
Patented Sept. 2, 1919.
2 SHEETS—SHEET 2.
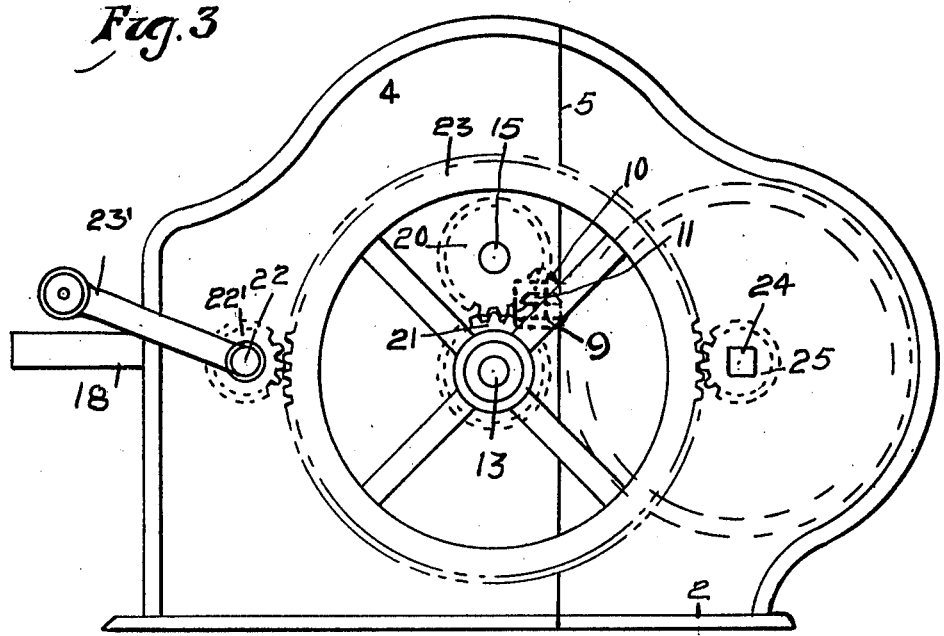
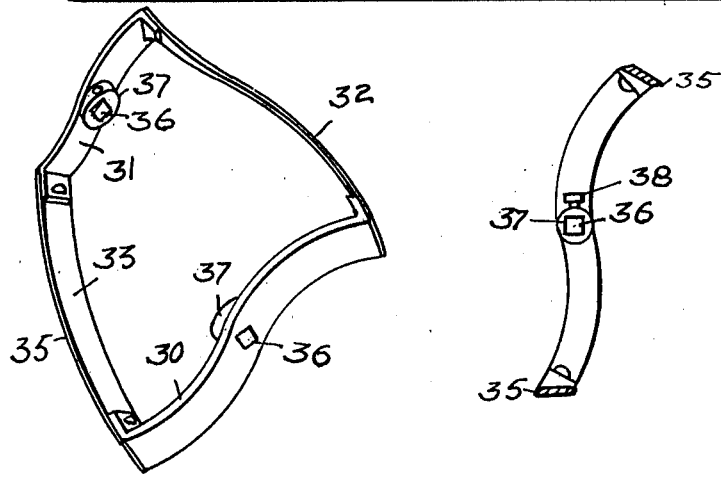
WITNESS
R. F. Dilworth
INVENTOR.
Louis Marko

UNITED STATES PATENT OFFICE.

LOUIS MARKO, OF AKRON, OHIO.

NOODLE-CUTTING MACHINE.

1,314,885. Specification of Letters Patent. Patented Sept. 2, 1919.

Application filed June 29, 1918. Serial No. 242,654.

*To all whom it may concern:*

Be it known that I, LOUIS MARKO, a citizen of Hungary, residing at Akron, in the county of Summit and State of Ohio, have invented new and useful Improvements in Noodle-Cutting Machines, of which the following is a specification.

This invention relates to a noodle cutting machine, and has for its object to provide, in a manner as hereinafter set forth, a machine of such class that it can be conveniently and quickly operated for rolling and flattening dough and then cutting the same into strips or noodles.

Further objects of the invention are to provide a noodle cutting machine which is simple in its construction and arrangement, strong, durable, convenient and efficient in its use, readily set up and comparatively inexpensive to manufacture.

With the foregoing and other objects in view the invention consists of the novel construction, combination and arrangement of parts, hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:

Fig. 3 is a side elevation.

Fig. 4 is a perspective view and Fig. 5 is a sectional view of a modified form of cutter.

Figure 1:
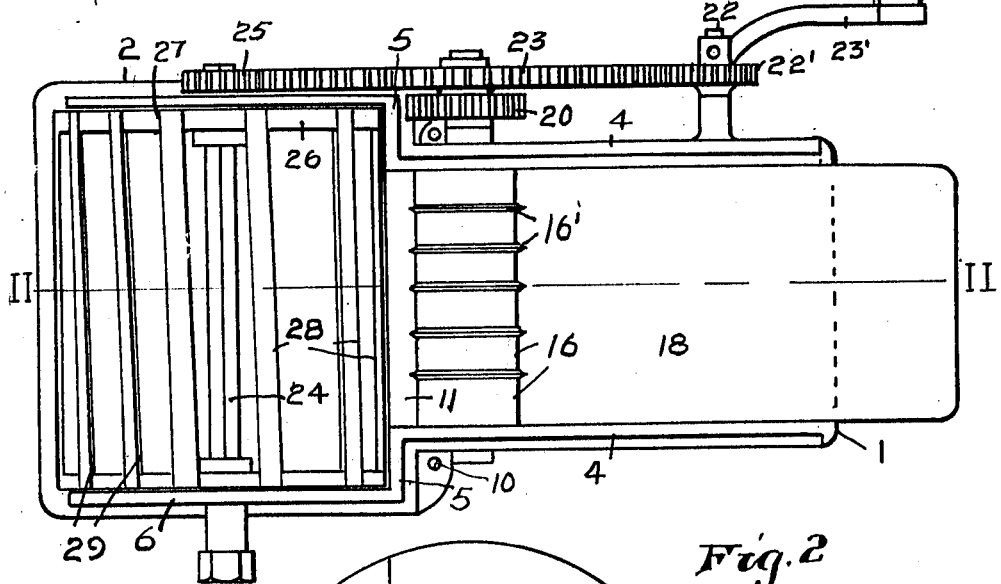
Figure 1 is a top plan view of a noodle cutting machine in accordance with this invention.
Figure 2:
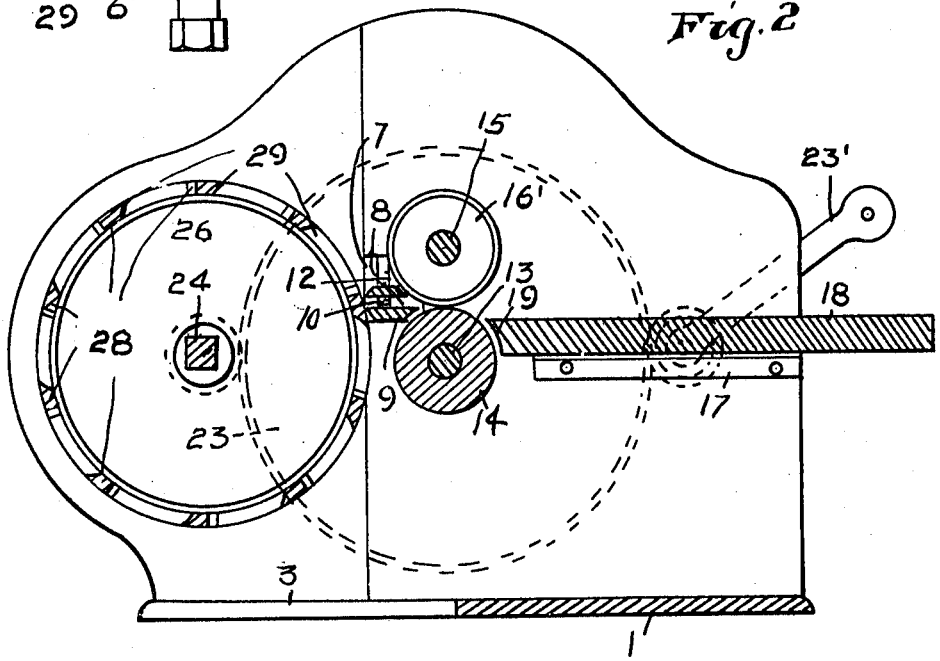
Fig. 2 is a section on line II—II, Fig. 1.

Referring to the drawings in detail 1 denotes a base plate, which is enlarged at its forward end as at 2. The plate 1 has a discharge opening 3.

Formed integral with or connected to the base plate in proximity to each longitudinal edge is a vertically disposed side member. Each of the side members consists of a rear portion 4, a right angular portion 5, and a forward portion 6, the latter is disposed in a plane parallel to the rear portion 4. The side members are oppositely disposed with respect to each other. The forward part of the rear portion 4, has an opening 7, and each right-angular portion 5, has an opening 8, which terminates in the opening 7.

Supported upon the bottom wall of each of the openings 7 and 8, is a transversely extending cutter plate 9, and arranged above the cutter plate 9, as well as being adjustably connected therewith by screws 10, is a transversely extending guide member 11, forming connection with the cutter plate 9, a guide passage 12, for the dough as it is fed to be cut. The width of the passage 12 can be adjusted by the member 11, through the medium of the screws 10.

Journaled in the rear portion 4, is a driven shaft 13, carrying a feed roll 14, and journaled in the rear portions 4 is a shaft 15, arranged in alinement with the shaft 14, and provided with a series of disks 16, positioned over feed roll 14, and having interposed therebetwen a series of cutting disks 16'. The passage between the roll 14 and 16, registers with the guide passage 12. The rolls 14 and disks 16, are arranged rearwardly of the cutter plate 9, and guide member 11.

Secured to the inner face of each of the rear portions 4, is a support 17, upon which is mounted a platform 18, the latter projects rearwardly from the side members, and extends forwardly to a point in close proximity to the lower roll 14. The forward end of the platform 18, is curved as at 19, and said platform 18, is adapted to receive the dough to be cut, the dough being taken up by the feed roll 14, and disks 16, and through their action supplied to the passage 12 for the purpose of being operated on by the cutter plate 9, and the cutter members to be presently referred to. The dough as it passes between the roll and disks is flattened and cut into strips so when operated on by the cutter plate and cutting members square flat noodles will be made.

The shaft 15, is extended at one end and provided with a pinion 20, which meshes with a pinion 21, secured on the extended end of the shaft 13 whereby when the latter is revolved the shaft 15 will be operated.

Carried by the extended end of the shaft 13, is a large gear-wheel 23. Journaled in one of the side members is a shaft 22, provided with a pinion 22' which meshes with the gear 23 for revolving it to operate the shaft 13. A handle 23' is carried by the shaft 22.

Journaled in the forward portions 6, of the side members is a shaft 24, having one end extended and provided with a pinion 25, which meshes with the gear 23. Secured upon the shaft 24, between the forward portions 6, is a pair of flanged disks 26, formed with inclined grooves 27, constituting seats in which are mounted cutter members 28, in the form of bars having cutting edges 29. The cutter members 28, are disposed at an inclination with respect to the axis of the shaft 24, so as to provide a shear cut when co-acting with the cutter plate 9.

When the pinion 25, is revolved the shaft 24, will be carried therewith under such conditions revolving the disks 26, these latter carrying the cutter members 28 therewith.

When the strips of dough are cut into squares through the action of the cutter members 28, in connection with the cutter plate 9, the squares will fall down through the opening 3, a suitable receptacle being positioned therebelow to receive the same.

A suitable cover can be employed to extend at the front and top of the side members so as to inclose the working parts and platform of the machine and also a cover can be employed to inclose the large wheel 23.

Referring to the Figs. 4 and 5 of the drawings, a cutting element, associating with the cutter plate 9, is shown and which consists of a pair of curved arms 30, 31, extending in opposite directions with respect to each other. The arm 30, is connected to the arm 31, by cutter bars 32, 33, which associates with the cutter plate 9. The bars 32, 33, are disposed at an inclination but at an opposite inclination with respect to each other. The bars 32, 33, each has a cutting edge at 35. Each of the arms 30, 31 is provided with a square opening 36, and a collar 37, for the purpose of mounting said arms upon the shaft 13. Collars 37 carry fastening screws 38, for fixedly securing the arms 30, 31, to the shaft 13.

What I claim is:

1. A machine for the purpose set forth comprising a support having a discharge opening in its base at its forward end, a stationary transversely extending cutter plate mounted in said support, an adjustable guide member arranged over said cutter plate and forming in connecton therewith a guide passage for the dough to be cut, superposed feed elements positioned in said support rearwardly of and in close proximity to said guide member, one of said feed elements provided with cutting disks, a platform leading to said feed elements, a shaft journaled in said support forwardly of said cutter plate, cutter bars having cutting edges coöperating with said cutter plate, supporting means for said cutter bars carried by said shaft, and means for simultaneously revolving said shaft and feed elements.

2. A machine for the purpose set forth comprising a stationary transversely extending cutter plate, a flat guide member adjustably mounted above said cutter plate and associating therewith to provide a guide passage for the dough to be cut, revolving feed elements arranged rearwardly with respect to said guide passage, one of said elements provided with cutting disks, inclined cutting bars forwardly of said cutter plate and having cutting edges associating with said cutter plate, supporting means for said cutting bars, and means for simultaneously revolving said supporting means and said feed elements.

3. A machine for the purpose set forth comprising a transversely extending stationary cutter plate, an adjustable guide member mounted over said cutter plate and forming in connection therewith a guide passage for the dough to be cut, a pair of superposed feed elements arranged rearwardly of and in close proximity to said guide passage, the upper of said elements provided with cutting disks, a revoluble support forwardly of said cutter plate, inclined cutter bars spaced from each other and carried by said support, said bars having cutting edges coöperating with said cutter plate, an operative drive connection between said support and elements for revolving them in unison, and means for operating said drive connection.

In testimony whereof I affix my signature.

LOUIS MARKO.